Nov. 10, 1970  G. F. SCHRADER  3,539,963
ELECTRICAL CONTACT FOR MOVING WIRE
Filed Oct. 2, 1967
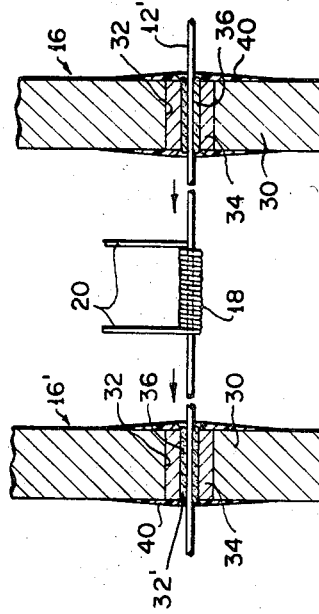
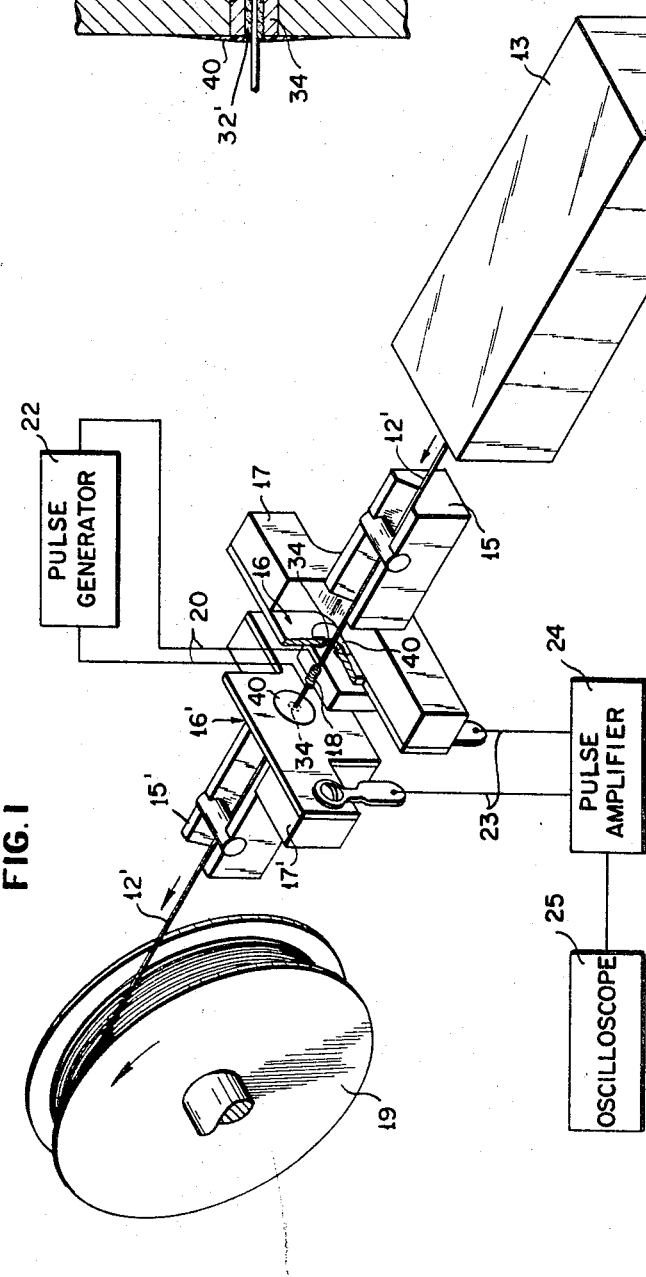
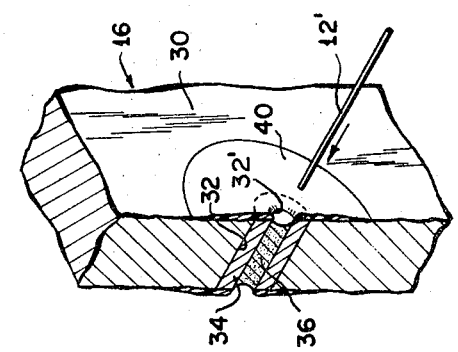
INVENTOR
GEORGE F. SCHRADER
BY *Louis A. Kline*
*John J. MacLago*
*Robert L. Harrington*
HIS ATTORNEYS United States Patent Office 3,539,963
Patented Nov. 10, 1970

3,539,963
ELECTRICAL CONTACT FOR MOVING WIRE
George F. Schrader, Lakewood, Calif., assignor to The National Cash Register Company, Dayton, Ohio, a corporation of Maryland
Filed Oct. 2, 1967, Ser. No. 672,032
Int. Cl. H01r 41/00
U.S. Cl. 339—9         5 Claims

ABSTRACT OF THE DISCLOSURE

A device for providing electrical contact with a moving wire with a minimum of resistance to the movement of the wire past the point of contact. An aperture having a relatively small diameter but sufficiently large enough to pass the wire, e.g., a $1/16$ inch diameter aperture for passing a $1/32$ inch diameter wire, is provided in an electrically conductive holder. The inner wall of the aperture is comprised of an electrically conductive material that will amalgamate an electrically conductive liquid metal, e.g., mercury. The mercury is placed in the aperture and is held there by surface tension and amalgamation. The wire is passed through the aperture and the liquid mercury envelops the portion of the wire being passed through the aperture to provide secure electrical contact therewith. The material of the holder adjacent to the aperture does not amalgamate with mercury to thereby avoid creeping of the mercury away from the aperture.

---

This invention relates to a device for continuously testing the electrical and/or magnetic properties of an indeterminate length of wire. For example, a pair of electrical contacts are provided at a spaced relationship and the wire is passed through the contacts. An electrical current is passed between the contacts and testing equipment tests the voltage drop between the contacts, any change in which indicates a vriance in the electrical properties of the portion of the wire between the contacts. Consequently, any portion of the wire that does not meet the established standards will be detected as that portion moves between the contacts.

One form of electrical contact is provided by metal rollers. The rollers transmit the electrical charge to the wire while avoiding a sliding frictional contact with the wire. However, even the rolling friction of the rollers is highly undesirable in that it produces a tension in the wire that can affect its electrical properties. Furthermore, the rollers contact only a small surface area of the wire and even a minute dirt particle may interfere with the electrical contact to give erroneous reading of the electrical properties. Thus, the electrical contact that is made by the roller is not considered reliable for testing purposes. A second form of electrical contact that provides a secure electrical contact while further reducing friction is referred to by the industry as a mercury cup. A pair of apertures are provided on the wall of a small cup that is filled with mercury. A wire is passed into and out of the cup through the apertures. The mercury fills in the aperture around the wire to, in effect, lubricate the wire and provide almost frictionless movement of the wire through the cup. The mercury being electrically conductive envelops the wire to provide a secure electrical contact therewith.

Although the described mercury cup contact is considered in the industry to be better than the solid contact provided, for example, by metal rollers, it is also not considered as being fully satisfactory. As the wire is drawn through the cups, mercury is pulled through the aperture. Mercury vapor is considered very dangerous and, accordingly, a real hazard is created by having the liquid mercury spilled around the working area where, for example, a lit cigarette may inadvertently vaporize the mercury. Furthermore, whereas the testing equipment may be moved from station to station as the need therefor arises, the mercury can be easily spilled out of the cup causing even further hazardous conditions. Also, whereas the mercury cup necessarily has a substantial thickness across which the electrical contact may be made, it is difficult to establish a specific point of contact.

In the prefered embodiment of the present invention, an electrical contact is comprised of a metal plate having a small aperture therein, with gold coated on the inner wall of the aperture (forming a gold sleeve insert having an opening no greater than $1/16$ inch diameter) and a liquid mercury filling in the aperture. The metal material of the plate will not amalgamate the mercury while the gold material will. Thus, the mercury clings to the gold facing on the inner wall of the aperture and has little or no attraction to the material of the plate. The surface tension forces of the liquid mercury form the liquid mercury into a continuous body of fluid having a meniscus that retains the liquid in the aperture. A wire that is drawn through the aperture will thus be completely surrounded by the mercury and whereas the coating on the wire will also not amalgamate with the mercury, it can be easily drawn through the aperture without pulling the mercury out with it. For safety purposes, it may be desirable to cover the walls of the plate around the aperture with a plastic shielding material or the like so that small leakage of mercury that may still result will be trapped between the plate and the shielding where it cannot be harmful to the careless actions of an operator.

The invention and its advantages will be further apparent by reference to the following detailed description and drawings wherein:

FIG. 1 is a schematic view illustrating a process that utilizes the electrical contact of the present invention;

FIG. 2 is a cross-sectional view of the electrical contracts of the present invention illustrated in the process of FIG. 1; and FIG. 3 is a perspective view of one of the electrical contacts with a portion thereof removed.

Referring to FIG. 1 of the drawings, the preferred embodiment of the invention is illustrated as being incorporated into a process wherein a supply of thin wire 12 is drawn from a supply roll 14 and directed through a coating process (represented by a box 13) wherein a magnetic thin coating is applied to the wire. The coated wire 12' having a diameter of about 0.007 inch in this embodiment is guided by a guideway 15 and 15' through a first electrical contact 16 (mounted on a support 17 that is affixed to the guideway 15) and then through a solenoid coil 18. The solenoid coil 18 is connected by electrical conductors 20 to a pulse generator 22 which produces a voltage drop in the magnetic coating on the portion of the wire within the solenoid coil. The wire 12' is then guided by guideway 15 and 15' through a second electrical contact 16' (mounted on a support 17') and then to a takeup rool 19.

The voltage drop produced across the coated wire 12' passing through solenoid coil 18 is sensed by the first and second electrical contacts 16, 16' and transmitted through conductors 23 to a pulse amplifier 24 which is then observed on an oscilloscope 25. This voltage drop is produced by the rotation of the magnetization in the magnetic coating of the wire (by the magnetic field produced in the solenoid coil due to current from the pulse generator). Any change in the coating will accordingly affect the voltage impulse which will be detected on the oscilloscope 25. A continuous quality check can thus be made on the magnetic coating without interfering with the coating process 13.

The electrical contacts 16 and 16' used in the process of FIG. 1 are shown more clearly in FIG. 2. A plate 30 of metal material that is electrically conductive, e.g., stainless steel, is provided with a small aperture 32, e.g., having .115 inch diameter in the embodiment described. The aperture 32 has a sleeve insert 34 of gold about .05 inch in thickness thereby reducing the aperture 32 to a reduced aperture 32' with an opening of .015 inch diameter. This reduced aperture 32' is filled with liquid mercury 36. The plate 30 of stainless steel does not amalgamate the liquid mercury 36 whereas the gold sleeve insert 34 does. The surface tension of the mercury is such that a uniform mass of the mercury is formed in the small aperture of the sleeve insert 34. The mercury attaches to the gold material of the sleeve insert and because of the unification of the mercury within the aperture, the entire mass of the mercury is held in the aperture. The magnetic coating that is provided on the wire 12' also does not amalgamate the mercury and, thus, the wire can be freely passed through the mercury. While the wire is passing through the aperture 32', a portion of the mercury is displaced causing it to push toward the outside edge of the aperture 32' (as seen in FIG. 2). However, because of the surface tension of the mercury and of the attraction of the mercury to the gold (and in that the mercury is not attracted, i.e., will not amalgamate to either the stainless steel of the plate 30, or to the wire 12'), the mercury is held within the aperture 32' and upon removal of the wire, the mercury is drawn back into its unified state within the aperture 32' (as seen in FIG. 3).

The unification of the mercury occurs because of the relationship of the surface tension of the mercury to the configuration of the aperture. If the aperture exceeds the established limitations, the surface tension of the mercury does not have sufficient attractive force to form the unification. When this occurs, the mercury can flow out of the aperture by reason of gravitational forces. Thus, it is considered important to maintain the relationship within the established limits.

The limits that are to be satisfied between the surface tension of the liquid metal (e.g., mercury) and the aperture configuration are established for the aperture as oriented in a "worst possible condition," i.e., with the aperture oriented vertically. The relationship to be satisfied is determined by the following:

The diameter of the aperture 32' in the sleeve insert is preferably less than four times the surface tension of the liquid metal divided by the density of the liquid metal multiplied by the length of the aperture 32', or $$d < 4s/Dl$$

where $d$ = aperture diameter
$s$ = surface tension of the liquid metal in contact with the sleeve insert (gold)
$D$ = density of the liquid metal
$l$ = length of the aperture It has been found that the length $l$ of the aperture should preferably be at least as great as the diameter $d$ and preferably as much as five times greater, e.g., with a stainless steel plate, a gold insert, and liquid mercury, a preferred configuration for the aperture is $d$=.015 inch, and $l$=.020 to .050 inch. Although it is preferable to keep the aperture small so as to provide a secure and precise electrical contact, it has been found from the above relationship that the diameter of the aperture in the gold insert can be made as large as one-sixteenth of an inch, and the mercury will still sufficiently amalgamate with or be attracted to the inner wall of the gold insert so as to be retained in the aperture while the wire is in continuous movement therethrough.

In repeated passes of the wire, some of the mercury may be lost and in time the mercury may have to be replenished in order to maintain the desired electrical contact. In that the gold will, to a very small degree, be dissolved in the mercury, a significant loss of the gold may occur after the mercury has been replaced many times. However, although gold is a costly material, when amortized over the prolonged use of the equipment, such replacement is in reality inexpensive.

A number of advantages are realized by the present invention. The mercury provides a very intimate contact with the wire and insures a satisfactory electrical contact. Also, such contact is provided at a very precise location as compared, for example, to a mercury cup where the exact point of contact cannot be accurately established. Also, as compared to the mercury cup, the device of the present invention can be operated at any angle, e.g., the wire can be passed through it in a vertical direction without spilling out the mercury, and the device can be easily moved between various locations also without spillage. The mercury in a mercury cup is easily spilled and cannot be easily or safely handled. As compared to the roller contact, the present invention provides for frictionless, as well as a more secure contact.

As pointed out previously, in repeated and prolonged use of the process, to some extent mercury may be pulled out of the aperture. Some of this mercury will tend to creep around the corner of the sleeve insert and down to the material of the plate 30. This exposed portion of the mercury may be considered hazardous (although to a substantially lesser extent than previous devices) and, thus, it may be desirable to provide a shield 40 over the wall of the plate 30, around the aperture. The shield may be constructed of, for example, polystyrene which does not amalgamate the mercury. The mentioned creeping will occur only between the shield and the plate and avoid exposure to the careless action of an operator.

The electrical contact described is intended to illustrate the invention and not to limit it. Thus, it will be understood that the invention may be satisfied with alternative constructions. For example, there are other liquid metal materials that are electrically conductive and will provide frictionless contact with a moving wire. Also, there are materials other than gold that will amalgamate the mercury, and in the case where other liquid materials are used, the selection of the sleeve insert will depend on satisfying the requirement that the material amalgamate with that liquid. The material for the holder should not amalgamate the conductive liquid and many materials are available other than stainless steel that will satisfy this requirement, e.g., aluminum. Also, such material may not even be required to be electrically conductive where the conductors are connected directly to the conductive material of the sleeve insert.

It will be understood that various other omissions, substitutions and changes in the form and details of the process and apparatus illustrated and in their operation may be made by those skilled in the art, without departing from the scope and spirit of the invention.

What is claimed is:

1. A device for providing secure electrical contact with a wire conductor while permitting essentially frictionless movement of the wire through the device comprising: an electrically conductive metal sleeve member having an aperture sufficiently small to pass a thin wire conductor, a liquid metal being electrically conductive deposited in the aperture, the metal sleeve member having the property of amalgamating with the liquid metal, and wherein the sleeve member is mounted in a holder having the property of not amalgamating the liquid metal, and means for providing electrical connection of the sleeve member to a desired electrical circuit.

2. A device for providing secure electrical contact with a wire conductor while permitting essentially frictionless movement of the wire through the device as defined in claim 1 wherein the aperture of the sleeve member is no greater than a sixteenth of an inch in diameter, the sleeve member is comprised of gold, and the liquid metal is comprised of liquid mercury.

3. In a process for testing the magnetic coating provided on a thin wire conductor, a device for providing precise, secure and essentially frictionless electrical contact with the wire conductor while the wire conductor is in continuous movement from the coating process through the testing process and past the stationary electrical contact device, said device comprising an electrically conductive metal plate having an aperture therethrough, an electrically conductive metal sleeve insert fitted within the plate aperture, said sleeve insert having an aperture with a diameter less than about one sixteenth of an inch and sufficiently large to freely pass the thin wire conductor, an electrically conductive metal liquid deposited in said sleeve insert to effectively lubricate the wire conductor against friction contact with the meal of the insert while providing inimate electrical contact therewith, and means for connecting the wire conductor to an electrical circuit through the plate, metal insert, and metal liquid, said metal plate, metal insert and metal liquid having the relative properties whereby the metal liquid will amalgamate with the metal insert and not wih the metal plate.

4. In a process for testing the magnetic coating provided on a thin wire conductor, a device for providing precise, secure and essentially frictionless electrical contact with the wire conductor while the wire conductor is in continuous movement from the coating process through the testing process and past the stationary electrical contact device as defined in claim 3 including a protective shield affixed to each side of the metal plate around the aperture in the metal insert, said shield having the property of not amalgamating the liquid metal.

5. In a process for testing the magnetic coating provided on a thin wire conductor, a device for providing precise, secure and essentially frictionless electrical contact with the wire conductor while the wire conductor is in continuous movement from the coating process through the testing process and past the stationary electrical contact device as defined in claim 4 wherein the metal insert is comprised of gold, the metal liquid is comprised of mercury, and the shield is comprised of a polystyrene plastic.

References Cited

UNITED STATES PATENTS 3,096,478   7/1963   Brown _____ 324—54

FOREIGN PATENTS 2,027,727   7/1956   Australia.
141,359   8/1920   Great Britain.

RICHARD E. MOORE, Primary Examiner

U.S. Cl. X.R.

339—118